July 18, 1961  A. C. SAMPIETRO  2,992,529
TURBINE BLADE COOLING
Filed Aug. 23, 1956  3 Sheets-Sheet 1
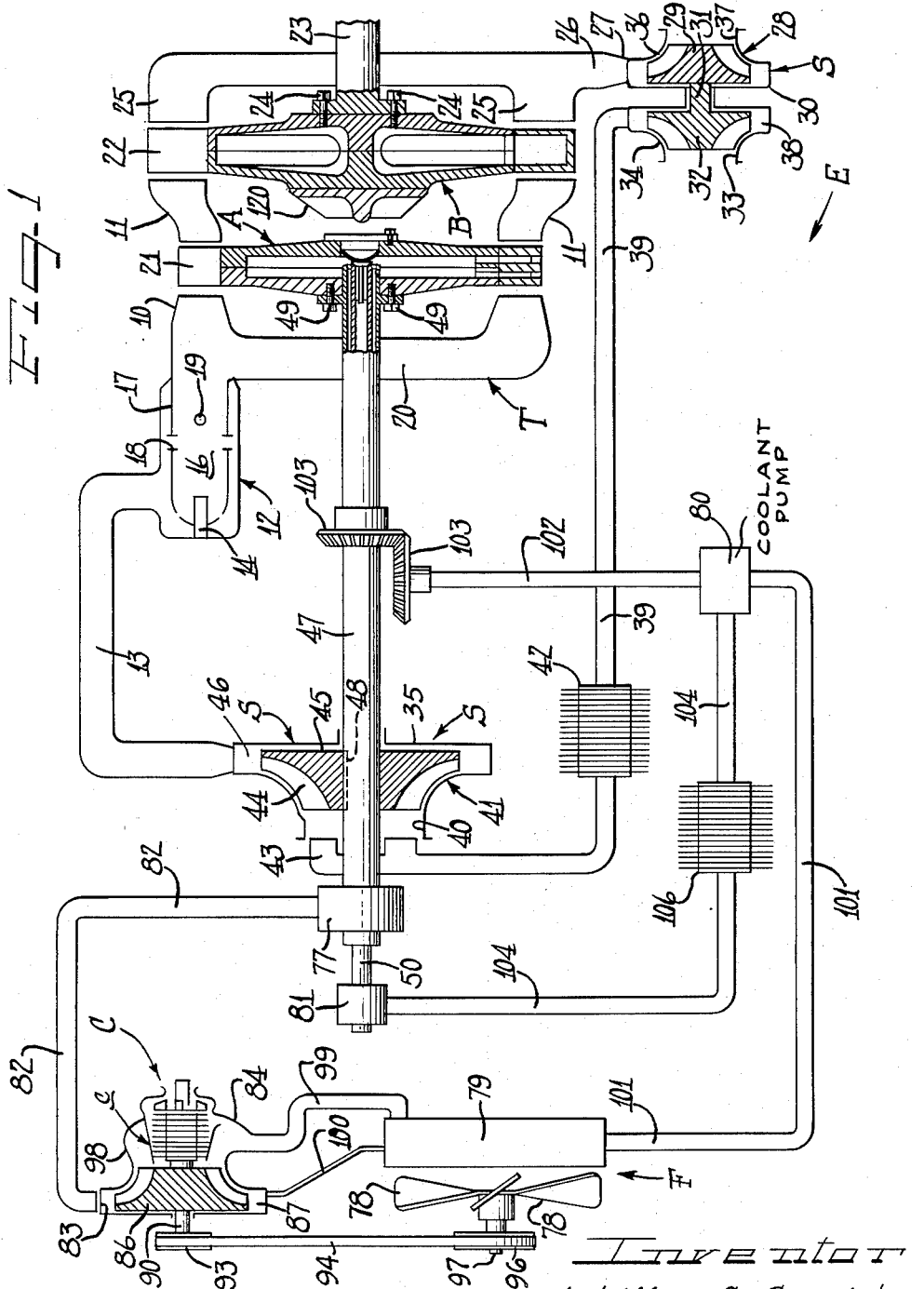
Inventor
Achilles C. Sampietro
By Hill, Sherman, Meroni, Gross & Simpson Attys

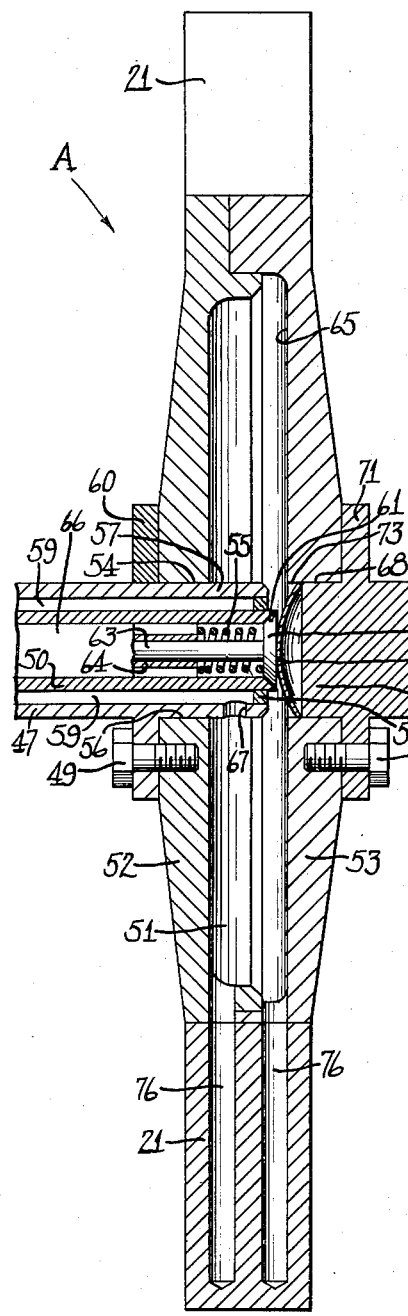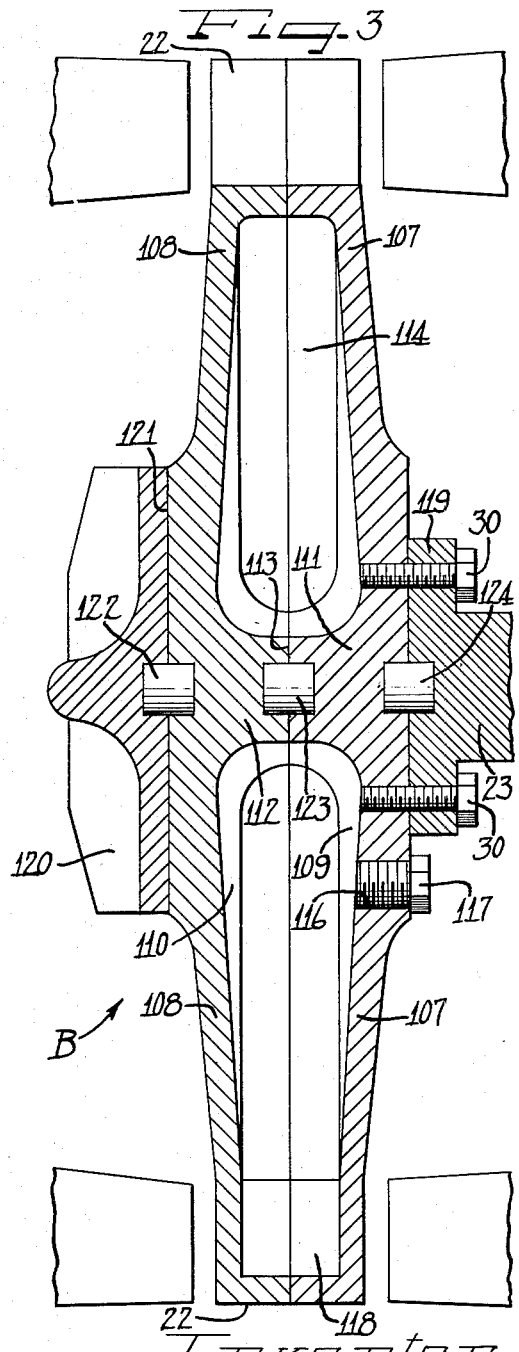

Inventor
Achilles C. Sampietro

United States Patent Office
2,992,529
Patented July 18, 1961

2,992,529
TURBINE BLADE COOLING
Achilles Charles Sampietro, Detroit, Mich., assignor to Thompson Ramo Wooldridge Inc., a corporation of Ohio
Filed Aug. 23, 1956, Ser. No. 605,736
1 Claim. (Cl. 60—39.16)

This invention relates to a cooling system for the turbine wheel and blade assembly of a turbine engine, driven by a high-temperature flow of gases from a burner, an internal combustion engine, or other suitable source.

Specifically, this invention relates to an internal cooling system for a hollow turbine wheel and blade assembly of a stage-compounded turbine engine, which contemplates the circulation of a coolant through the hollow interiors of the turbine wheel and blades whenever a predetermined operating temperature of the turbine wheel and blade assembly is reached, thus extending the useful life of the turbine engine.

One of the many limiting factors in the use of higher volatility range fuels as a means of increasing the thermodynamic efficiency of turbine engines has been the increased deterioration and reduction in operating life of the turbine blades when subjected to the higher temperatures normally associated with the use of these fuels. As the temperature of the driving combustion gases increases, there is not only a marked increase in the deterioration of the blades, due to a reduction in the strength characteristics and oxidation of the exposed blade surfaces, but there is also a substantial reduction in the impact resistance of the blade surfaces to foreign particles, which are inevitably present in the operation of high-speed turbine engines.

A problem is thus presented as to a means of reducing the adverse effects on the turbine wheel and blades of a turbine engine when higher volatility range fuels are employed to increase the thermodynamic efficiency of the turbine engine.

The present invention offers one solution to this problem in the form of a hollow turbine wheel and blade assembly which incorporates an internal cooling system for the blades and turbine wheel that may be integrally formed with the blade, or incorporates an external cooling apparatus, thereby reducing the heating effects of the gas flow on the blades and turbine wheel assembly.

Briefly described, the present invention contemplates a hollow turbine wheel and blade assembly in which the wheels are constructed in halves, or as a single unit, in such a manner that these assemblies will have hollow registering interiors. A suitable coolant is added to the hollow interior of the turbine wheel and blades during assembly or installation and provision is made for circulation of the coolant in the wheel and blade assemblies during rotation.

The half-wheel turbine assemblies may be constructed of ferrous materials and thereafter assembled by bonding, brazing or welding. The exposed surfaces of the assembled turbine wheels may be treated with aluminum, or other bright-metal, to resist corrosion and oxidation.

In one embodiment of the present invention, a self-contained cooling system is provided in the hollow interior of the turbine wheel structure, cooling there being accomplished by thermo-syphon circulation of the coolant, which results from differences in density of the coolant due to circulation through the hot turbine blades and the centrifugal force effects generated by the wheel rotation.

In another embodiment of the invention, an external cooling system is utilized to condense and cool vaporous coolant withdrawn from the interior of the turbine wheel assembly, to be subsequently readmitted into the turbine wheel to cool the blades and wheel assembly, as required.

In still another embodiment of the present invention, a hollow turbine wheel and blade assembly is constructed with a hollow integral shaft portion, through which the coolant can circulate. A cooling sleeve, having a series of cooling fins spaced around its outer periphery, is slipped over the hollow integral shaft portion, to assist in transferring heat from the coolant to a cooling air flow around the hollow shaft and sleeve.

Accordingly, it is an object of the present invention to provide an improved high temperature turbine wheel assembly.

Another object of the present invention is to provide an improved internally cooled turbine wheel assembly, to extend the operating range of the assembly into higher temperature range gas flows.

A further object of the present invention is to improve the thermodynamic efficiency of a turbine engine by internally cooling the turbine wheel assembly to accommodate the use of higher temperature ranges.

A still further object of the present invention is to provide an external cooling system for the turbine wheel assembly of a turbine engine, which effectively utilizes the vaporized coolant from an internally cooled turbine wheel assembly to augment the refrigeration characteristics of the external cooling system for the coolant.

Many other objects and advantages of the present invention will become apparent to those versed in the art upon making reference to the detailed description which follows and the accompanying sheets of drawings.

On the drawings:

FIGURE 1 is a schematic view, party in section and partly in elevation, of a turbine engine incorporating an external cooling system for an internally cooled turbine wheel assembly in the turbine engine, according to the present invention;

FIGURE 2 is an enlarged cross-sectional view, with parts in elevation, of the first stage-compounded externally cooled turbine wheel assembly of FIGURE 1;

FIGURE 3 is an enlarged cross-sectional view, with parts in elevation, of the second stage-compounded internally cooled turbine wheel assembly of FIGURE 1.

As shown on the drawings:

Figure 4:
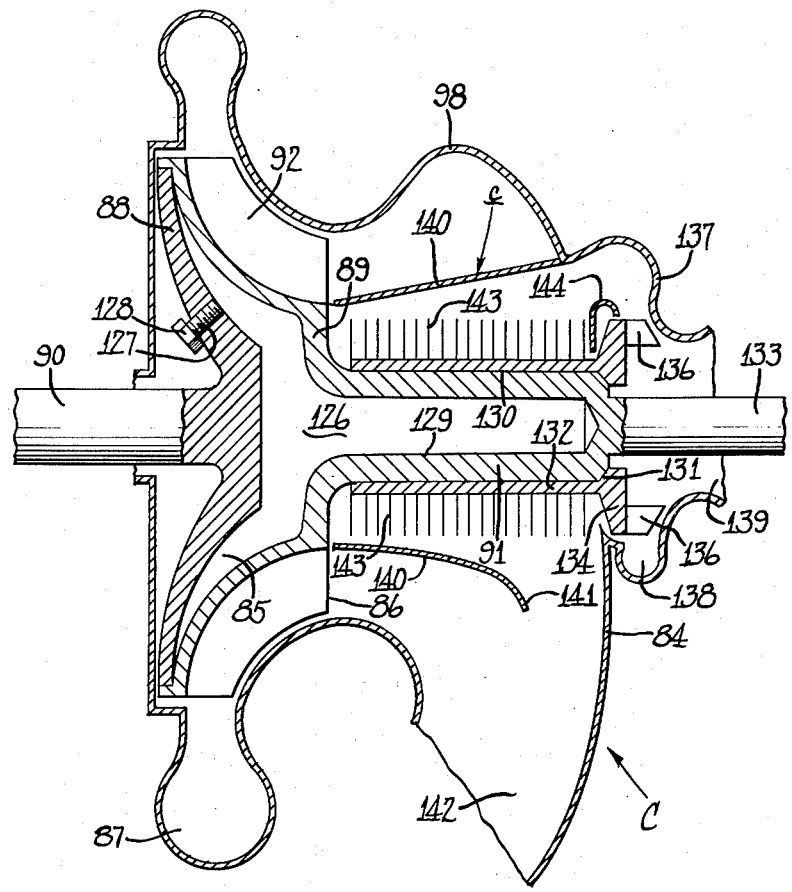
FIGURE 4 is an enlarged cross-sectional view, with parts in elevation, of the vaporous coolant driven turbine wheel assembly in the external cooling system of FIGURE 1, according to the principles of the present invention.

In FIGURE 1 an externally cooled turbine engine E is illustrated, which is comprised generally of a two-wheeled, contra-rotating, stage-compounded, turbine wheel assembly T, a two-stage turbo-supercharger assembly S, and a refrigerator system F, for circulating coolant through the turbine wheel assembly T.

The turbine wheel assembly T is comprised generally of a hollow, first stage-compounded turbine wheel A, a second stage-compounded turbine wheel B, a nozzle assembly 10 and a connecting diffuser passage 11. A burner assembly 12 receives a flow of pressurized air through a conduit 13, and a flow of fuel from a source not shown. A fuel nozzle assembly 14 sprays fuel into a chamber 16 formed by a combustion chamber liner 17 in the burner assembly 12.

It will be noted that the turbine wheel A and wheel B are of the stage-compounded, contra-rotating type, there being no intermediate stator vane assembly to change the flow direction of the driving combustion gas flow from the turbine wheel A. By providing a two-wheeled, contra-rotating, stage-compounded turbine wheel assembly, much higher efficiencies are obtainable than with the conventional velocity compounded wheels, or reaction wheels, as the kinetic energy losses through the stator in this type of wheel assembly are eliminated.

A plurality of mixing vents or ports 18 in the combustor chamber liner 17, create a turbulent mixing action in the fuel-air mixture in the chamber 16 preparatory to ignition by an igniting device 19, as for example, a spark plug. Once ignited by the igniting device 19, the combustion process in the chamber 16 will be self-propagating until the fuel flow is stopped.

A high temperature flow of pressurized combustion gases will thus be continuously generated in the chamber 16, from which they will be communicated through a system of conduits 20, to the nozzle assembly 10. The high velocity flow of pressurized combustion chamber gases will then be directed by the nozzle assembly 10 into a ring of circumferentially spaced blades 21 around the periphery of the turbine wheel A.

The first-stage collector ring assembly 11 receives a discharge flow of combustion chamber gases from the blade assembly 21 and directs these gases into a second ring of circumferentially spaced blades 22 on the contrarotating turbine wheel B. The arrangement, position and shape of the blades 22 on the turbine wheel B, relative to the blades 21 on the turbine wheel A, is such as to permit an immediate impingement of the gases onto the blades without the imposition of a stator vane assembly, as previously mentioned. The torque generated by the turbine wheel A is transmitted to turbine wheel B through the diffuser passage 11. Torque generated by the turbine wheel B is transmitted to a drive shaft 23, which is secured to the turbine wheel B by a plurality of fasteners 24.

An exhaust gas collector manifold 25 receives discharging combustion gases from the blades 22, of the turbine wheel B, and directs these gases through a conduit 26, into a nozzle assembly 27 of a first-stage turbo-supercharger assembly 28. A centripetal turbine wheel 29 is enclosed by an annular inlet manifold 30, which serves to channel combustion chamber gases from the nozzle assembly 27 into the turbine wheel 29.

The turbine 29 of the first-stage turbo-supercharger 28 is secured to a shaft 31 which drives a first-stage centrifugal flow compressor 32 having an axial flow inlet 33 formed by an enlosing housing member or shroud 34. A housing member 36 or shroud encloses the centripetal turbine 29, and forms an axial exhaust outlet 37 for combustion gases discharging from the eye of the turbine 29.

Ambient air axially enters the inlet 33 of the first-stage centrifugal flow compressor 32 and is radially accelerated into an annular volute 38, to be directed through a connecting conduit 39, to an inlet 40 of a second-stage centrifugal flow compressor assembly 41.

An intercooler 42, of the type having a radiation chamber and a plurality of cooling fins spaced around the periphery thereof, for example, is utilized to intercool pressurized air in the conduit 39 before entering the second-stage compressor assembly 41.

Intercooled pressurized air in the conduit 39 passes through an inlet manifold 43 and inlet 40 of the second-stage compressor assembly 41, into a plurality of vanes 44 on a centrifugal flow compressor 45. The centrifugal flow compressor 45 radially accelerates the initially pressurized air from the first-stage turbo-supercharger assembly 28 into an annular volute 46, from which it is directed by the conduit 13 into the burner assembly 12. The volute 46 and axial inlet 40 are formed integrally with a housing 35, which encloses the second-stage compressor 45.

It will be understood that while the first and second stages of the turbo-supercharger assembly S have been shown in spaced relationship to each other in FIGURE 1, in actual construction, the first and second stages of the turbo-supercharger assembly S would probably be in much closer proximity to each other, the spaced relationship of these components in FIGURE 1 being only for purposes of clarity.

The compressor 45 of the second-stage compressor assembly 41 is secured to a tubular drive shaft 47 by a suitable fastener as, for example, a key 48. The tubular drive shaft 47 is secured in driven engagement to the turbine wheel A by a plurality of suitable fasteners 49.

Referring now to FIGURE 2 in conjunction with FIGURE 1, a more detailed explanation of the external cooling system for the hollow internally cooled turbine wheel A will follow.

As best shown in FIGURE 2, the tubular drive shaft 47 encloses a second concentric tubular coolant shaft 50, which projects into a cooling reservoir cavity 51 formed between respective wheel halves 52 and 53 of the turbine wheel A.

The wheel halves 52 and 53 are constructed of ferrous material and assembled by high temperature brazing or welding. The exposed surfaces of the assembled wheel are treated with a thin layer of aluminum which becomes bonded to the turbine wheel surfaces and thus provides a corrosion-resistant surface to combustion chamber by-products.

In addition, a layer of aluminum may be applied to the engaging surfaces of the wheel halves 52 and 53 to exploit the self-welding properties of the iron-aluminum alloy, during the assembly process.

The wheel half 52 is centrally axially bored as at 54 to form an engaging surface 56 between the side 52 and an internal extension 57 of the tubular drive shaft 47. An annular spacer 58 is provided between the tubular drive shaft 47 and tubular coolant conduit shaft 50 to maintain a spaced relationship between the respective shafts, and also to prevent an unmetered return flow of coolant around the open end of the tubular shaft 47 into a passage 59 formed between the respective tubular shafts 47 and 50.

An annular flange 60 is provided on the drive shaft 47 to receive the fasteners 49 therethrough and secure the drive shaft assembly to the turbine wheel A, and also to form a positioning stop to limit the amount of axial entry of the drive shaft extension 57 into the coolant chamber 51.

The coolant conduit shaft 50 projects into the interior of the reservoir cavity 51 to point past the annular spacing member 58, and is centrally inwardly beveled to form a valve seat 61. A conically tapered valve disc 62, is selectively seated on the valve seat 61, which serves to close the end of the coolant shaft 50.

The valve disc 62 includes a stem 63 which is reciprocably journaled in a spider, or valve stem support member 64. The spider 64 is suitably retained in the coolant conduit shaft 50, as by a shoulder or fasteners, and a spring 55 is positioned between the spider 64 and the valve disc 62 to normally bias the valve disc 62 off its seat 61.

The internal extension 57 of the tubular drive shaft 47 is radially bored as at 67 to form a metering return flow inlet for vaporous and liquid coolant in the chamber 51 flowing out of the turbine wheel A through the passage 59.

If a single turbine wheel is to be utilized in the turbine assembly T, rather than the stage-compounded assembly illustrated in FIGURE 1, the adjacent wheel half 53 is bored as at 68, coaxial with the bore 54, to receive a stub projection 69 of a connecting drive shaft 70. The connecting drive shaft 70 is flanged as at 71 to receive a plurality of connecting fasteners 72 therethrough.

In FIGURE 2, the stub shaft projection 69 is axially inserted in the bore 68 a sufficient amount to form a retaining recess 73 between an internal face portion 65 of the wheel half 53 and the end of the stub shaft projection 69. A thermostatically deflectable disc 74 is inserted in the recess 73 in such a manner as to engage the valve disc 62 and assume an inward convex axial deflection, and thus closing the passage 66 when the coolant temperature in the chamber 51 is at a relatively low value.

The convex thermostatically-sensitive disc 74 may be constructed of any suitable temperature-critical component or components, such that the degree of convexity of the disc 74 will vary inversely with the temperature of the coolant in the chamber 51, thereby providing a temperature-sensitive actuator which permits the valve disc 62 to move off its seat 61, whenever a predetermined coolant temperature is reached.

It should be understood that while a simple thermostatically-activated disc 74 has been illustrated as exemplary of a means of activating the valve disc 62, any other suitable thermo-sensitive device might be incorporated to regulate the movement of the valve disc 62 and corresponding flow of coolant into the chamber 51.

It will be noted from FIGURE 2, that the turbine wheel blades 21 are hollow, their central portions having a plurality of radial bores 76 which register with the cooling chamber 51, thereby permitting coolant from the chamber 51 to be circulated through the bores 76 in the blades 21.

It will be understood that the blades 21 could initially be formed with a hollow central cavity, rather than having the cavity formed by the bores 76, depending upon the particular blade material, method of construction and application.

Referring again to FIGURE 1, the external cooling system F for the turbine wheel A is comprised generally of a vaporous coolant collecting collar 77, a vaporous coolant driven turbine assembly C, a fan 78, a condenser 79, a liquid coolant pump 80 and a liquid coolant collar assembly 81, which returns a flow of cooled liquid coolant to the passage 66, for recirculation in the cooling chamber 51 of the turbine wheel A.

When the temperature of the coolant in the chamber 51 has reached a certain predetermined value, the thermostatically-deflectable disc 74 will be deflected away from the valve disc 62, thereby permitting the valve disc 62 to be unseated and a consequent flow of coolant through the passage 66 results. A metered return flow of partially vaporous and liquid coolant will then be induced through the return flow inlet 67 into the return passage 59. Vaporous coolant will then flow through the collecting collar assembly 77 to a conduit 82, which supplies pressurized vaporous coolant to an inlet 83 for the vaporous coolant turbine driven assembly C.

The turbine assembly C is comprised of a housing 84, which encloses a centripetal turbine impeller 86, an integral internal cooling system c and an annular volute 87, the annular volute 87 being integrally formed with the housing 84.

As more clearly shown in FIGURE 4, the impeller 86 is hollow, and is constructed in two separate sections 88 and 89, respectively, which define a coolant vaporizing chamber 85 therebetween, the section 88 including an integral drive shaft 90, while the section 89 includes an integral hollow axially extending cooling shaft 91, whose purpose and function will be more clearly described later.

The turbine wheel section 89 is also provided with a plurality of radially depending turbine blades 92 which receive a driving flow of vaporous coolant from the conduit 82, and thus transmit torque to the drive shaft 90.

Torque generated by the turbine 86 is transmitted from the drive shaft 90 to a pulley 93, to drive the fan assembly 78 through a connecting fan belt 94 and pulley 96 secured to a drive shaft 97.

It should be understood that while a fan belt and pulley system has been illustrated as a means of driving the fan assembly 78, any other suitable torque transmitting system might be incorporated, as for example, a gear train or fluid torque converter.

Vaporous coolant discharging from the turbine 86 flows into an annular collector manifold 98 which is integrally formed with the turbine assembly housing 84 to be then directed into a conduit 99 which communicates with the condenser assembly 79.

A liquid coolant by-pass conduit 100 delivers condensed liquefied coolant that collects in the annular volute 87 to the condenser 79.

The fan assembly 78 is so positioned in relation to the condenser 79, as to direct a cooling flow of air around the condenser 79, thereby increasing the cooling capacity and the rate of liquefication of vaporous coolant in the condenser 79.

Liquefied coolant is withdrawn from the condenser 79 through a conduit 101 by a combined gravity feed and suction developed by the pump 80. The pump 80, is driven for example, by a drive shaft 102 which receives torque through a bevel gear train 103 connected to the tubular drive shaft 47 of the turbine wheel assembly A.

It should be understood that any other suitable power source could be used to drive the pump 80, the drive shaft 102 and bevel gear train 103 being illustrated as exemplary of one possible drive system.

Pressurized coolant discharging from the pump 80 flows through a connecting conduit 104 through a suitable intercooler 106, similar to the cooler 42, from which it is communicated to a liquid coolant collar 81, circumscribing the tubular coolant conduit 50.

Upon reaching the coolant collar 81, the relatively cold coolant may then flow through the coolant passage 66 into the cooling chamber 51 of the turbine wheel A, whenever the valve 62 is unseated.

It will thus be appreciated that the external cooling system F, forms a complete cooling cycle for coolant in the chamber 51 of the turbine wheel A, which permits a continuous operation of the turbine wheel A in a flow of combustion chamber gases having a substantially higher temperature than would be possible without internal cooling.

Referring now to FIGURE 3 in conjunction with FIGURE 1, the turbine wheel assembly B has a similar construction to that of the turbine wheel A, in that it is constructed in two parts, namely a concave half-wheel 107 and a concave half-wheel portion 108. Each of the half-wheels 107 and 108, are provided with a plurality of internal radial fins or vanes 109 and 110, respectively. The half-wheel portions 107 and 108 include central inwardly extending boss portions 111 and 112, respectively, which form a surface of contact 113 between their engaging surface faces, to maintain a predetermined spaced relationship between the respective half-wheel portions 107 and 108.

As shown in FIGURE 3, the internal vanes 109 and 110 are similar to each other in size and shape, their hub portions following a radius of curvature approximating that of the radius of curvature formed by the centrally inwardly extending bosses 111 and 112.

The vanes 109 and 110 have a tapering radial cross-section, the vanes having a greater area at their hub which becomes progressively smaller radially outwardly toward the edge of the turbine wheel. At the juncture of the blades 22 with the half-wheel portions 107 and 108, the vanes 109 and 110 become integral with the internal faces of the half-wheels 107 and 108.

As a result of the centrally inwardly extending hub portions 111 and 112 on the concave half-wheels 107 and 108 of the turbine wheel assembly B, a chamber 114 is formed between the respective side faces of the blade assembly, in which a suitable coolant is added.

To facilitate the addition or removal of coolant from the cooling chamber 114, the half-wheel 107 is drilled and threaded as at 116 to receive a filler plug 117.

The turbine wheel blades 22, are constructed with a hollow interior 118, which registers with the coolant chamber 114, similar to the turbine wheel blades 21 on the turbine wheel assembly A. The main drive shaft 23 is flanged as at 119 to receive a plurality of suitable fasteners 30, which transmit torque from the turbine wheel assembly B to the main drive shaft 23.

In the embodiment of the turbine wheel assembly B, illustrated in FIGURE 3, an axially positioned centrifugal cooling wheel or impeller 120 is centrally secured to the external hub portion of the turbine half-wheel 108, having its axis of rotation coaxial with that of the main drive shaft 23 and turbine wheel assembly B. The centrifugal impeller 120 is secured to the turbine half-wheel 108 along a surface of juncture 121, by brazing, welding, or with some other suitable fastener, and serves to direct a vortex flow of cool air across the face of the turbine half-wheel 108.

Three coaxial splined pins 122, 123 and 124 are provided between the impeller 120, turbine half-wheel 108, turbine half-wheel 107 and between the main drive shaft 23 to prevent any relative rotation between each of the aforementioned components.

It should be understood that while splined pins 122, 123 and 124 are illustrated in FIGURE 3 as a means of preventing relative rotation between the respective turbine wheel components, any other suitable retaining means could be incorporated, depending upon a particular construction or installation.

The concave turbine wheel side portions 107 and 108 are assembled by a high-temperature brazing or welding process, similar to the assembly procedures used in the construction of the recess turbine wheel side portions 51 and 53 of the turbine wheel assembly A.

The exposed surfaces of the turbine wheel assembly B may be similarly coated with a layer of aluminum, or other corrosion-resistant metal, to reduce surface oxidation and deterioration of the turbine wheel assembly and to facilitate the welding operation, similar to the protective aluminum alloying step applied to the turbine wheel assembly A, aforementioned.

Referring now more particularly to FIGURE 4, a more detailed explanation of the construction and internal cooling system c of the turbine assembly C will follow.

The turbine assembly C is of a two-piece construction, 88 and 89, respectively, similar to the construction used in the construction of the turbine wheels A and B. A chamber 126 is thus formed between the respective side portions 88 and 89, into which a suitable coolant is added. A threaded filler port 127 in the turbine wheel portion 88, receives a filler plug 128 thus to facilitate the addition or removal of coolant, as may be required.

The turbine wheel assembly C differs in construction from that of the turbine wheel assemblies A and B, in that the side portion 89 is axially extended as at 91 to form an integrated hollow turbine drive shaft.

The integrated hollow axial shaft 91 is axially centrally bored as at 129, preferably having a slightly tapering cross-section.

The hollow shaft portion 91 has an outside diameter portion 130 of cylindrical or tapered cross-section, and is beveled as at 131 to form a retaining shoulder for a sleeve-like cooling muff assembly 132, which is internally dimensioned to permit a snug fitting assembled relationship along the contacting outer surface 130 and shoulder 131 of the hollow axle shaft 91.

The hollow shaft 91 extends beyond the housing 84 as a solid cross-sectional reduced diameter portion 133, which may be effectively utilized as a drive shaft for additional accessories, if necessary.

The cylindrical sleeve-like muff assembly 132 has a flared end portion 134 which includes a peripheral ring of centrifugal flow-inducing vanes 136, a combined housing and baffle assembly 137, and an axial flow inlet 139 for the vane assembly 136. The housing and baffle assembly 137 encloses the muff 132 and vanes 136, and forms an annular volute 138 for a flow of cooling air discharging from the vane assembly 136.

The baffle portion 140 of the combined housing and baffle assembly 137 is axially tapered inwardly toward the half wheel 89 of the turbine wheel assembly C to prevent any flow of hot vaporous coolant from the vanes 92 around the cooling muff assembly 132.

The baffle assembly 140 has an outlet 141 discharging into a vaporous coolant outlet 142 in the housing 84. The high velocity flow of vaporous coolant through outlet 142 in the housing 84 produces a venturi action at the outlet 141 of a baffle 140 which creates a region of low pressure to increase the flow of air through and around the cooling muff 132.

A plurality of integral cooling fins 143 are provided around the outer periphery of the muff 132, thereby increasing dissipation of heat into the flow of cooling air around the muff assembly 132. A small secondary baffle 144 is positioned adjacent the flanged portion 134 on the muff 132, to direct the radially accelerated flow of cooling air into the cooling fins 143 and form a cooperating pressure recovery passage with the volute 138.

The cooling cycle of the integral cooling system c for the turbine wheel assembly C, is as follows: Relatively cold coolant in the hollow shaft portion 91 will be drawn toward the vaporizing cavity 85 formed adjacent the vanes 92 due to the strong field of centrifugal force existing in this portion of the wheel, and also due to the differences in density between vaporous coolant in the vaporizing cavities 85 and the relatively heavy cold liquid coolant in the hollow shaft portion 91. Hot vaporous coolant in the vaporizing cavities 85 will then be displaced centrally inwardly toward the hollow shaft portion 91, where, due to the cooling action of air flowing across the fins 143, the hot vaporous coolant will be recondensed and liquefied to complete a cooling cycle for the wheel assembly C.

Thus, it will be appreciated that the turbine wheel assembly C contains an integral cooling system c which utilizes an extended hollow shaft portion of the turbine wheel to form a heat sink for a coolant which is internally circulated through the hollow internal portions of the wheel assembly, due to the combined action of vaporization and density differential between the vaporous and liquid coolant and the centrifugal effects resulting from the rotation of the wheel.

As in the construction of the turbine wheel assemblies A and B, the separate components of the wheel assembly C, may be fabricated from steel or other materials, and assembled by high-temperature brazing or welding. The exposed surfaces of the wheel may also be treated with aluminum, or other corrosion-resistant material, to extend the operating life of the wheel assembly.

While I have mentioned no specific coolant in each of the embodiments of my invention, it should be understood that the particular coolant to be employed will depend upon the operating temperature range and conditions to be expected in a particular installation, and any one of more of the commonly known coolants having the properties herein described would be equally usable in my invention.

While I have illustrated only three specific embodiments of by invention, it should be understood that many other modifications and variations may be effected without departing from the scope of the novel concepts herein disclosed.

I claim as my invention:

A cooled turbine drive which comprises a first turbine wheel having a ring of hollow blades therearound, a second turbine wheel, a combustion chamber, a first conduit connected with said combustion chamber arranged to impinge the gases emanating from said combustion chamber upon the blades of said first turbine wheel to drive said first wheel, means directing the gases from the first turbine wheel to the second turbine wheel to drive the second turbine wheel, second conduit means one end portion of which is arranged to receive the gases from said second turbine wheel, a third turbine wheel arranged in close proximity to the other end portion of said second conduit to receive the gases flowing therethrough, said third turbine wheel being driven by said gases from said second turbine wheel, a first stage compressor arranged to be driven by said third turbine wheel, a third conduit leading from said first stage compressor to carry compressed air therefrom, a second stage compressor connected to the other end portion of said third conduit to receive compressed air therethrough from said first stage compressor, an intercooler in said third conduit between said first and second stage compressors to cool air delivered to the second stage compressor, a fourth conduit connected to said combustion chamber, means supplying air from said second stage compressor through said fourth conduit to said combustion chamber, means for admixing said air with fuel in said combustion chamber, means in said combustion chamber for igniting the fuel and air mixture to form said hot gases to drive said first and said second turbine wheels, means for flowing a coolant through the hollow turbine blades of the first turbine wheel, a fourth turbine driven by pressurized coolant from said hollow turbine blade, a condenser for liquefying coolant from said fourth turbine, a pump for feeding coolant from said condenser back to the hollow turbine blades, and said first turbine wheel operatively connected with said pump and said second stage compressor to drive the same.

References Cited in the file of this patent

UNITED STATES PATENTS

| | | |
|---|---|---|
| 2,095,991 | Lysholm | Oct. 19, 1937 |
| 2,159,422 | Buchi | May 23, 1939 |
| 2,369,795 | Planiol et al. | Feb. 20, 1945 |
| 2,611,440 | Haworth et al. | Sept. 23, 1952 |
| 2,625,012 | Larrecq | Jan. 13, 1953 |
| 2,650,060 | Stalker | Aug. 25, 1953 |
| 2,672,010 | Newcomb | Mar. 16, 1954 |
| 2,672,013 | Lundquist | Mar. 16, 1954 |
| 2,748,566 | Fletcher | June 5, 1956 |
| 2,778,601 | Eckert | Jan. 22, 1957 |
| 2,779,565 | Bruckmann | Jan. 29, 1957 |

FOREIGN PATENTS

| | | |
|---|---|---|
| 677,052 | Great Britain | Aug. 6, 1952 |